Nov. 14, 1967   C. P. FROMMELT ETAL   3,352,314
LOADING DOCK SHELTER
Filed Feb. 24, 1967   2 Sheets-Sheet 1
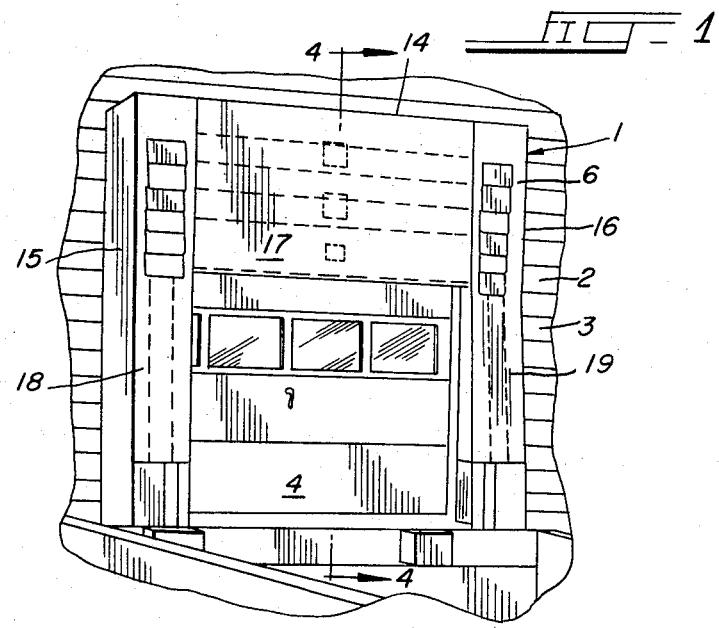
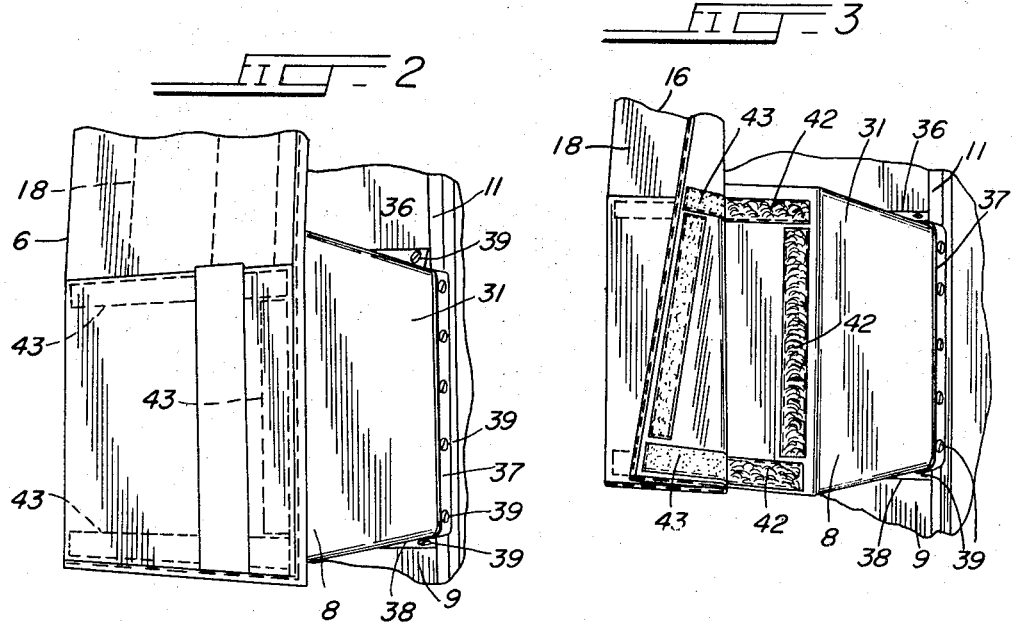
INVENTORS.
CYRIL P. FROMMELT
SYLVAN J. FROMMELT
BY
Marzall, Johnston, Cook & Root
ATTYS.

Nov. 14, 1967    C. P. FROMMELT ET AL    3,352,314
LOADING DOCK SHELTER
Filed Feb. 24, 1967    2 Sheets-Sheet 2
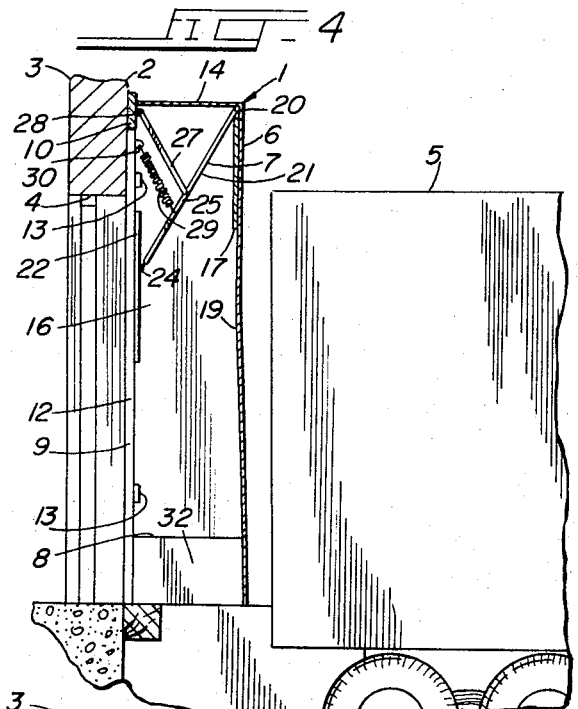
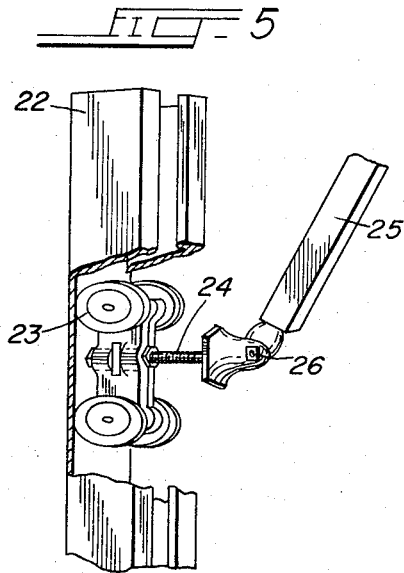
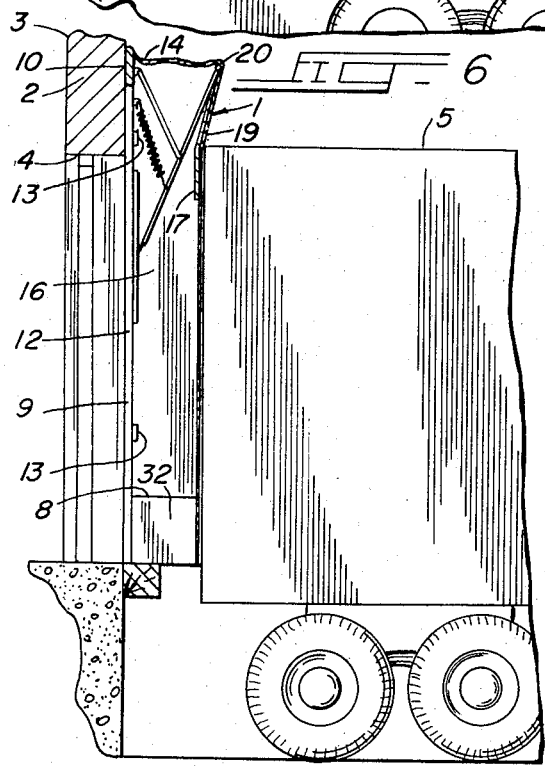
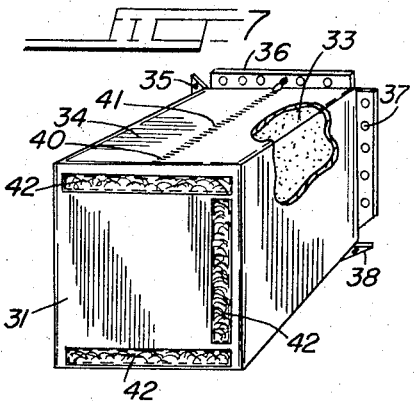
INVENTORS.
CYRIL P. FROMMELT
SYLVAN J. FROMMELT
BY Marzall, Johnston, Cook & Root
ATTYS.

United States Patent Office 3,352,314
Patented Nov. 14, 1967

3,352,314
LOADING DOCK SHELTER
Cyril P. Frommelt and Sylvan J. Frommelt, Dubuque, Iowa, assignors to Dubuque Awning & Tent Co., Dubuque, Iowa, a corporation of Iowa
Filed Feb. 24, 1967, Ser. No. 618,428
10 Claims. (Cl. 135—5)

ABSTRACT OF THE DISCLOSURE

A loading dock shelter having a cover which is at least partially supported by resilient pads.

Background of the invention

This invention relates to loading dock shelters, and, more particularly, to such shelters that are particularly well adapted for use as truck dock shelters.

It is a primary object of the present invention to afford a novel loading dock shelter.

Another object of the present invention is to afford a novel loading dock shelter embodying resilient pads constituted and arranged in a novel and expeditious manner.

Loading dock shelters of the retractable type, such as, for example, loading dock shelters of the type shown in our United States Letters Patent No. 2,892,463 have been heretofore known in the art. Also, loading dock shelters of the type embodying resilient pad members against which trucks, and the like, to be loaded and unloaded may be backed, such as, for example, loading dock shelters of the type shown in our United States Letters Patent No. 3,181,205 also have been heretofore known in the art. Such loading dock shelters have been highly successful and afford effective shelter for men and materials during the loading and unloading of a truck, or the like, through a warehouse doorway equipped with such a shelter. Both of these shelters afford effective, automatic sealing engagement between the shelters and the truck operatively engaged therewith.

It is an object of the present invention to enable novel loading dock shelters to be afforded which, like shelters of the type disclosed in the aforementioned patent No. 2,892,463, embody cover members which drape around a truck or the like in good sealing engagement therewith, but which embody pad structures constituted and arranged in a novel and expeditious manner.

Another object of the present invention is to afford loading dock shelters of the aforementioned type to be afforded wherein the resilient pads thereof may be readily removed and replaced.

Another object is to afford a novel loading dock shelter of the aforementioned type which can be quickly and easily mounted on and removed from a warehouse wall, or the like.

Yet another object is to afford a novel loading dock shelter which embodies a cover member mounted on and carried by spaced upper and lower supporting members in a novel and expeditious manner.

In some loading dock shelters heretofore known in the art, wherein a cover member has been supported by upper and lower supporting members, the lower supporting members have been subject to being broken or otherwise damaged by trucks backing thereagainst, and the like. It is an important object of the present invention to overcome this.

Another object of the present invention is to afford novel loading dock shelters of the type wherein cover members are supported by upper and lower supporting members, wherein the lower supporting members are in the form of resilient pads.

Yet another object of the present invention is to afford a novel loading dock shelter of the type wherein a cover member is supported by spaced upper and lower supporting members, and wherein the parts thereof are so constituted and arranged that the lower end of the cover member may be quickly and easily attached to, and released from, the lower supporting members in a novel and expeditious manner.

A further object of the present invention is to afford a novel loading dock shelter of the aforementioned type which is practical and efficient in operation, and which may be readily and economically produced commercially.

Other and further objects of the present invention will be apparent from the following description and claims and are illustrated in the accompanying drawings, which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Description of the drawings

In the drawings:

FIG. 1 is a front perspective view of a loading dock shelter embodying the principles of the present invention, with the shelter shown mounted in operative position around the doorway of a warehouse;

FIG. 2 is an enlarged, fragmentary view of the lower left portion of the loading dock shelter shown in FIG. 1;

FIG. 3 is a view similar to FIG. 2, with certain of the parts disposed in different positions;

FIG. 4 is a longitudinal sectional view taken substantially along the lines 4—4 in FIG. 1;

FIG. 5 is a fragmentary perspective view of a portion of the upper extension mechanism shown in FIG. 4;

FIG. 6 is a view similar to FIG. 4, but showing certain parts disposed in different operative positions; and FIG. 7 is a perspective view of the cushion shown in FIG. 3.

Description of the embodiment shown herein

A loading dock shelter 1 embodying the principles of the present invention is shown in the drawings to illustrate the presently preferred embodiment of the present invention. It is shown mounted on an outer wall 2 of a warehouse 3 in surrounding relation to a doorway 4 in the warehouse wall 2, FIG. 1. As will be discussed in greater detail presently, it is operable to afford an effective shelter between a truck 5 and the doorway 4, when, as shown in FIG. 6, the truck 5 is disposed in normal operative position relative to the doorway 4 for loading and unloading operations to be effected through the doorway 4 and the rear end of the truck 5.

The loading dock shelter 1 embodies, in general, a cover 6 supported from a supporting frame 9 by an upper supporting unit 7 and a lower supporting unit 8, which are preferably vertically spaced from each other. In operation, the shelter 1 is mounted on the warehouse 3 in such position that the cover 6 projects outwardly from the wall 2 in position to be operatively engaged by a truck, such as the truck 5, as will be discussed in greater detail presently.

The supporting frame 9 may be made of any suitable material such as, for example, wood, and embodies a substantially horizontally extending top rail or crossbar 10 and two substantially vertically extending side rails 11 and 12, FIGS. 2 and 4. The side rails 11 and 12 are secured at their upper ends to respective opposite ends of the crossbar 10 and project downwardly therefrom.

In operation, the frame 9 is secured to the outer face of the warehouse wall 2 by suitable means such as bolts 13, FIGS. 4 and 6, in such position that the crossbar 10 extends across the doorway 4 in upwardly spaced relation thereto, and the side rails 11 and 12 extend along respective opposite sides of the doorway 4 in outwardly spaced relation thereto.

The cover 6, which is mounted on the supporting frame 9 in position to be extended outwardly therefrom, embodies an elongated top wall 14, two elongated side walls 15 and 16 extending downwardly from respective opposite ends of the top wall 14, a head curtain 17 depending from the top wall 14, and two elongated side curtains 18 and 19 extending inwardly toward each other from the side walls 15 and 16, respectively. The side curtains 18 and 19 are disposed in outwardly overlying relation to the head curtain 17. The walls 14–16 and the curtains 17–19 may be made of any suitable material, but preferably they are made from a water repellent, wear resistant material such as, for example, canvas duck or rubber-impregnated nylon fabric.

It will be observed that the cover 6 is of a type which may be termed a "drape-type." That is, it embodies walls and curtains which consist of fabric or sheet material supported in more or less a tent-like manner as distinguished from fabric or sheet material affording the casing of a pad or pillow, or the like.

The supporting frame 9 is disposed at the rear of the loading dock shelter 1, and the rear longitudinal edges of the walls 14–16 of the curtain 6 are secured to the rails 10–12, respectively, by suitable means such as nails or screws, not shown. The side walls 15 and 16 are secured along their upper ends to the respective opposite ends of the top wall 14 by suitable means, such as sewing, and the curtains 17–19 are similarly secured along their upper edges to the front longitudinal edge of the top wall 14. The side curtains 18 and 19 are similarly secured along their outer longitudinal edges to the front longitudinal edges of the side walls 15 and 16, respectively.

The upper supporting unit 7 of the preferred form of loading dock shelter 1 shown in the drawings is of the type disclosed in our United States Letters Patent No. 2,892,463. It embodies an elongated frame member 20, FIGS. 4 and 6, disposed within the cover 6 and secured thereto along the junction of the top wall 14 with the head curtain 17. The frame member 20 preferably extends the full length of the top wall 14, and is supported at its opposite ends by suitable retractable, automatically-extending, supporting mechanisms 21 disposed at respective opposite sides of the doorway 4. The supporting mechanisms 21 are identical in construction and operation, and only one such mechanism is shown in the drawings, FIGS. 4 and 6, that being sufficient for an understanding thereof by those skilled in the art.

The supporting mechanism 21 mounted at the right side of the doorway 4, as viewed in FIG. 1, includes an elongated channel member or track 22, FIGS. 4 and 5, secured to the front face of the side rail 12 of the supporting frame 9 in longitudinally extending relation thereto. A carriage 23 is mounted in the channel member 22 for reciprocation longitudinally thereof, and includes an arm or bar 24 projecting forwardly from the channel member 22. The lower end of another arm or bar 25 is pivotally secured to the front end of the arm 24 by suitable means as a pin or bolt 26, FIG. 5. The upper end of the arm 25 is secured to the frame member 20. The lower end of another arm or bar 27 is pivotally secured to the arm 25, intermediate the ends of the latter, and the upper end of the arm 27 is pivotally secured to an arm or bar in the form of a bracket 28 stationarily secured to the upper end portion of the side rail 12 and projecting forwardly therefrom. It will be understood that the upper supporting mechanism at the other side of the doorway 4 is similarly mounted on the side rail 11 of the supporting frame 9.

As will be appreciated by those skilled in the art, the mechanisms 21 embody a toggle joint afforded by the arms 25 and 27, and another toggle joint afforded by the arms 24 and 25. A tension coil spring 29 has its upper end connected to the supporting frame 9 by suitable means such as a bracket 30 secured to the side rail 12, and has its lower end secured to the supporting mechanism 21 in position to continuously urge the carriage 23 upwardly in the channel member 22 and thereby continuously afford an expanding force on the toggle joint afforded by the members 24 and 25 and on the toggle joint afforded by the members 25 and 27. The expanding force thus applied to each of the toggle joints is effective to cause each of them to urge the frame 20 and the cover 6 outwardly away from the supporting frame 9.

It will be seen that with this construction, the upper supporting unit 7 not only affords an effective support for the cover 6, but also applies a strong, but yieldable, extending force to the upper portion thereof to thereby continuously urge the cover 6 into fully extended position and then continue to afford an extending force on it.

The lower supporting unit 8 embodies two resilient cushions 31 and 32, FIGS. 2 and 4, mounted on the side rails 11 and 12, respectively, of the supporting frame 9 adjacent the lower end of the cover 6. The cushions 31 and 32 afford resilient members against which a truck, such as the truck 5, may back when it is being maneuvered into position to be loaded or unloaded through the warehouse door 4, as will be discussed in greater detail presently, and, in the preferred form of the invention, each embodies a substantially rectangular shaped resilient pad 33 closely covered by a complementary, wear-resistant casing 34, FIG. 7. The pad 33 may be made of any suitable material such as, for example, any suitable natural or synthetic, compressible, resilient resin or polymer, our preferred material being a foamed polyether. Similarly, the casing 34 may be made of any suitable material, but preferably is made of a flexible, water-repellant, wear-resistant material, such as, for example, the aforementioned canvas duck or rubber-impregnated nylon fabric.

Each of the casings 34 embodies four flaps 35, 36, 37 and 38 projecting from respective sides of one end thereof, FIG. 7, and the resilient members 31 and 32 are secured to the side rails 11 and 12, respectively, by suitable fastening members such as screws 39, FIGS. 2 and 3, extending through the flaps 35–38 into the respective side rails 11 and 12. Preferably, each of the casings 34 has an opening 40 in one side thereof through which the pad 33 may be inserted and removed from the casing 34 so that the pads 33 are readily replaceable. Also, the opening 40 preferably is normally held in closed position by suitable releasable means, such as, for example, a zipper 41.

The resilient members 31 and 32 are secured to the side rails 11 and 12 of the frame 9 in directly rearwardly disposed relation to the lower end portions of the side curtains 18 and 19, respectively. They extend longitudinally outwardly from the frame 9 in a substantially horizontal direction and, when the loading dock shelter 11 is in fully extended position, as shown in FIG. 4, the free ends of the resilient members 31 and 32 are preferably disposed in engagement with the rear faces of the substantially vertically disposed side curtains 18 and 19, respectively. Also, preferably, the lower end portions of the side curtains 18 and 19 are releasably secured to the resilient members 31 and 32 so as to hold the lower end portion of the cover 6 against flapping in the wind, and the like. However, as will be appreciated by those skilled in the art, such construction merely constitutes the preferred embodiment of the present invention and our invention is not limited thereto.

In the preferred form of loading dock shelter shown in the drawings, a plurality of securing members or fastening members 42, in the form of elongated, substantially rectangular-shaped strips, are mounted on and secured to the outer face of the free end of each of the casings 34, in closely adjacent, spaced relation to respective marginal edges thereof, FIGS. 3 and 7. A plurality of other fastening members 43, which are similar in size and shape to the fastening members 42, are mounted on the inner face of the lower end portion of each of the side curtains 18 and 19, as illustrated with respect to the side curtain 18 in FIGS. 2 and 3. The fastening members 43 are disposed in such position on the side curtains 18 and 19 that each of them is disposed in horizontally-forwardly, parallel, juxtaposition to a respective one of the fastening members 42 when the side curtains 18 and 19 are disposed in the aforementioned, normal operative position, FIGS. 1 and 4.

The fastening members 42 and 43 are of the type which, when they are pressed into engagement with each other, firmly but releasably adhere to each other to afford a strong connection for holding the cushions 31 and 32 and the lower end portions of the side curtains 18 and 19, respectively, together, but with the connection being one which may be readily torn apart manually when it is desired to release the cover 6 from the cushions 31 and 32. The members 42 and 43 preferably are strips of fastening material of the type readily available on the market under the trademark "Velcro," wherein the face of one of the complementary strips 42 or 43, which faces toward the other complementary strip 43 or 42, respectively, constitutes a brushed suitable material such as nylon, or the like, to present a fuzzy face, and the other of the respective complementary strips 43 or 42 has a face embodying a plurality of small hooks formed from nylon, or the like, with the hooks operable to releasably engage in, and thereby adhere to the fuzzy face of the respective complementary strip. However, the fastening members 42 and 43 may be of other suitable material, such as, for example, suitable pressure-sensitive adhesive material, commonly available on the market which may be repeatedly adhered to and released from each other.

In the use and operation of the loading dock shelter 1, the cover 6 and the supporting units 7 and 8 may be mounted on the supporting frame 9. The thus assembled loading dock shelter 1 may then be mounted in operative position at the desired location, such as, for example, on the warehouse wall 2 in surround relation to the doorway 4 therein.

In such an operative position, when the loading dock shelter 1 is not in use, it is held by the supporting units 7 and 8 in fully extended position relative to the warehouse wall 2, as shown in FIG. 4. When it is desired to move a truck, such as the truck 5, into position for loading or unloading through the doorway 4 in the warehouse 3, the truck 5 may be backed into position wherein the rear ends of the side walls thereof engage the side curtains 18 and 19, respectively; the top thereof engages the head curtain 17; and the lower portion of the truck box engages the side curtains 18 and 19 directly forwardly of the cushions 31 and 32. Thereafter, continued backing of the truck 5 partially retracts the upper supporting unit 7, and partially compresses the lower supporting unit 8, as illustrated in FIG. 6, and moves the truck into such position relative to the loading dock shelter 1 that the cover 6 is snugly engaged with the rear end thereof and is draped therearound. With this engagement between the truck 5 and the loading dock shelter 1, a snug, weather-tight seal is afforded between the cover 6 and the body of the truck, which affords effective protection against the weather for the workmen and materials passing between the warehouse 3 and the truck 5 during loading and unloading operations. Subsequently, when the truck 5 moves away from the warehouse 3, the upper supporting unit 7 and the lower supporting unit 8 automatically expand into their fully extended positions to thereby again move the cover 6 into fully extended position.

It will be seen that with this construction, the supporting unit 8 affords a supporting structure for the lower portion of the cover 6, which is substantially impervious to damage. Unlike some of the lower supporting units for loading dock shelters heretofore known in the art, which are relatively easily sprung or broken by a truck backing thereagainst at an improper angle, the lower supporting unit 8 of the loading dock shelter 1 may be engaged by a truck backing thereagainst at substantially any angle effective to move the truck into proper loading or unloading positions, without damage thereto.

Also it will be seen that with a loading dock shelter constructed in the manner of the preferred form of loading dock shelter 1 shown in the drawings, both the upper and lower portion of the cover 6 is resiliently urged outwardly at all times to afford a firm, effective seal between the cover 6 and a truck disposed in normal loading and unloading position relative to the warehouse doorway 4.

In addition, it will be seen that the loading dock shelter 1 is so constructed that if, during such loading or unloading operations, the position of the truck engaged therewith shifts, the cover 6 can automatically correspondingly shift to maintaing its aforementioned sealed engagement therewith.

As will be appreciated by those skilled in the art, the particular form of the upper supporting mechanism 7 disclosed herein is shown merely by way of illustrating the presently preferred form of upper supporting mechanism and not by way of limitation, and other forms of upper supporting units, including suitable stationary, non-retractable units and retractable units of types other than that shown in the drawings hereof, may be used without departing from the broader aspects of the present invention.

From the foregoing it will be seen that the present invention affords a novel loading dock shelter embodying a novel cushion construction constituted and arranged in a novel and expeditious manner.

In addition it will be seen that the present invention affords a novel, yieldable, supporting structure for the lower portion of loading dock shelter covers.

Also, it will be seen that the present invention affords a novel loading dock shelter which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A loading dock shelter comprising
 (a) a cover extending along the top and sides of a door of a warehouse,
 (b) lever means connected to the upper portion of said cover and mounted on said warehouse for yieldingly holding the upper portion of said cover in extended relation to said warehouse, and
 (c) means for supporting the lower portion of said cover,
 (d) said last mentioned means consisting of resilient cushion means, compressible in all directions, connected to the lower portion of said cover and disposed in abutting engagement with said warehouse for yieldingly holding said lower portion of said cover in extended relation to said warehouse.

2. A loading dock shelter as defined in claim 1, and in which
 (a) said cushion means comprises
  (1) a casing secured to said lower portion of said cover and to said warehouse, and
  (2) a pad of cellular, resilient, compressible material removably mounted in said casing.

3. A loading dock shelter as defined in claim 1 and
 (a) in which (1) said lever means comprises toggle joint means connected to said upper portion of said cover and to said warehouse, and (b) which includes (1) resilient means connected to said toggle joint means and to said warehouse for maintaining a spreading force on said toggle joint means sufficient to extend it and thereby said upper portion of said cover and then to continue to provide an extending force on said toggle joint means and said upper portion of said cover.

4. A loading dock shelter for protecting a doorway in a warehouse, or the like, and comprising (a) a drape-type cover connected to such warehouse along the top and sides of such a doorway, (b) means connected to the upper portion of said cover and connected to said warehouse for holding said upper portion of said cover in extended position relative to the warehouse, and (c) resilient pad means connected to said warehouse between said warehouse and the lower portion of said cover, for yieldingly holding said lower portion of said cover in extended position relative to said warehouse, (d) said pad means being disposed in vertically spaced relation to said first mentioned means.

5. A loading dock shelter as defined in claim 4, and in which (a) said first mentioned means comprises retractable lever means connected to the upper portion of said cover and to said warehouse for retracting and extending said upper portion.

6. A loading dock shelter as defined in claim 4, and in which (a) said first mentioned means are resilient for yieldably holding said upper portion of said cover for movement toward and away from said warehouse.

7. A loading dock shelter as defined in claim 4, and in which (a) said pad means comprises (1) a casing attached to such a warehouse, and (2) a pad of cellular, resilient, compressible material removably mounted in said casing.

8. A loading dock shelter as defined in claim 7, and in which (a) said pad comprises a foamed polyether.

9. A loading dock shelter comprising (a) a cover adapted to extend along the top and sides of a warehouse door, (b) lever means connected to the upper portion of said cover and adapted to be mounted on said warehouse for yieldingly holding the upper portion of said cover in extended relation to said warehouse, (c) cushion means connected to the lower portion of said cover and adapted to be disposed in abutting engagement with said warehouse for yieldingly holding said lower portion of said cover in extended relation to said warehouse, (d) adhesive means mounted on said cushion, and (e) other adhesive means mounted on said lower portion of said cover, (f) said other adhesive means being releasably adhered to said first mentioned adhesive means for securing said lower portion of said cover to said cushion in quickly releasable relation thereto.

10. A loading dock shelter for protecting a doorway in a warehouse, or the like, and comprising (a) a cover adapted to be connected to such a warehouse along the top and sides of such a doorway, (b) means connected to the upper portion of said cover and adapted to be connected to such a warehouse for holding said upper portion of said cover in extended position relative to the warehouse, (c) cushion means adapted to be connected to such a warehouse between said warehouse and the lower portion of said cover, for yieldingly holding said lower portion of said cover in extended position relative to said warehouse, (d) said cushion means being disposed in spaced relation to said first mentioned means, (e) said cushion means comprising (1) a casing adapted to be attached to such a warehouse, and (2) a pad of cellular, resilient, compressible material removably mounted in said casing (f) said casing (1) being elongated, (2) embodying outwardly projecting means on one end thereof for attaching said casing to such a warehouse for supporting said casing in substantially horizontally outwardly projecting relation to said warehouse, (3) having an opening in one side thereof, and (4) including means for opening and closing said opening, and (g) said pad comprising an elongated block (1) substantially complementary in shape to the interior of said casing, and (2) insertable and removable into and out of said casing through said opening when the latter is open.

References Cited

UNITED STATES PATENTS

| | | |
|---|---|---|
| 2,567,995 | 9/1951 | Eshnaur. |
| 2,682,274 | 6/1954 | Miller. |
| 2,840,091 | 6/1958 | D'Azzo. |
| 2,892,463 | 6/1959 | Frommelt et al. _____ 135—5 |
| 3,181,205 | 5/1965 | Frommelt et al. _____ 52—204 |
| 3,216,433 | 11/1965 | D'Azzo _____ 135—5 |
| 3,230,675 | 1/1966 | Frommelt et al. |
| 3,303,615 | 2/1967 | O'Neal. |
| 3,322,132 | 5/1967 | Rieder et al. _____ 135—5 |

DAVID J. WILLIAMOWSKY, *Primary Examiner.*

PETER M. CAUN, *Examiner.*